United States Patent
Perrot

(10) Patent No.: US 9,660,981 B2
(45) Date of Patent: May 23, 2017

(54) STRONG AUTHENTICATION METHOD

(71) Applicant: IN-WEBO TECHNOLOGIES, Paris (FR)

(72) Inventor: Didier Perrot, Paris (FR)

(73) Assignee: InWebo Technologies, Paris (FR)

( * ) Notice: Subject to any disclaimer, the term of this patent is extended or adjusted under 35 U.S.C. 154(b) by 0 days.

(21) Appl. No.: 14/899,545

(22) PCT Filed: Jun. 30, 2014

(86) PCT No.: PCT/FR2014/000161
§ 371 (c)(1),
(2) Date: Dec. 17, 2015

(87) PCT Pub. No.: WO2015/007958
PCT Pub. Date: Jan. 22, 2015

(65) Prior Publication Data
US 2016/0149893 A1 May 26, 2016

(30) Foreign Application Priority Data

Jul. 19, 2013 (FR) ...................................... 13 57116

(51) Int. Cl.
*H04L 9/32* (2006.01)
*H04L 29/06* (2006.01)
*G06F 21/34* (2013.01)

(52) U.S. Cl.
CPC ............ *H04L 63/083* (2013.01); *G06F 21/34* (2013.01); *H04L 9/3226* (2013.01);
(Continued)

(58) Field of Classification Search
CPC ..... H04L 63/083; H04L 63/06; H04L 9/3226; H04L 9/3276; G06F 21/34
(Continued)

(56) References Cited

U.S. PATENT DOCUMENTS 8,196,198 B1 * 6/2012 Eger ........................ G06F 21/36
726/2
8,392,986 B1 * 3/2013 Gossweiler, III ....... G06F 21/46
713/172
(Continued)

FOREIGN PATENT DOCUMENTS

EP 2339497 6/2011
FR 2937204 4/2010
(Continued)

OTHER PUBLICATIONS

International Search Report for International Application No. PCT/FR2014/000161, mailed Nov. 6, 2014.
(Continued)

*Primary Examiner* — Haresh N Patel

(57) ABSTRACT

The present invention relates to a method of authenticating, with an authentication server, a user having at his disposal a calculator storing at least one unique identifier specific to the calculator and one first secret key (K0) and calculating a non-invertible function (H); the method comprising: •reception of the unique identifier by the authentication server, which sends an item of information (challenge) and an action code; •reception by the authentication server of three results of the non-invertible function, •the first result (R0) depending on at least one item of data specific to a unique or quasi-unique element of the calculator (SN); •the second result (RT) depending on a Turing test, conditioned to the action code, carried out by the user; and •the third result (R1) depending on a second secret key (K1); •authentication of the user if all four of the unique identifier and the first, second and third results are valid.

11 Claims, 1 Drawing Sheet

(52) U.S. Cl.
CPC ............ *H04L 9/3276* (2013.01); *H04L 63/06* (2013.01); *G06F 2221/2103* (2013.01)

(58) Field of Classification Search
USPC .................................................. 726/5, 7, 9
See application file for complete search history.

(56) References Cited

U.S. PATENT DOCUMENTS

| | | | | | |
|---|---|---|---|---|---|
| 8,484,700 | B2* | 7/2013 | Hulten | .................. | H04L 63/102 726/3 |
| 8,542,251 | B1* | 9/2013 | Gossweiler, III | ... | G06F 3/04883 345/649 |
| 8,555,353 | B2* | 10/2013 | Von Ahn | .................. | G06F 21/36 726/5 |
| 8,621,396 | B1* | 12/2013 | Gossweiler, III | ..... | G06F 3/0488 713/183 |
| 2005/0097179 | A1* | 5/2005 | Orme | .................... | H04L 12/585 709/207 |
| 2008/0256008 | A1* | 10/2008 | Kwok | .................... | G06N 3/004 706/20 |
| 2009/0106697 | A1* | 4/2009 | Ward | .................... | G06Q 10/06 715/835 |
| 2010/0144314 | A1* | 6/2010 | Sherkin | .............. | G06Q 20/3226 455/411 |
| 2010/0223471 | A1* | 9/2010 | Fresko | .................... | H04L 63/08 713/176 |
| 2011/0185407 | A1 | 7/2011 | Perrot | | |
| 2012/0054834 | A1* | 3/2012 | King | ........................ | G06F 21/31 726/4 |
| 2013/0174271 | A1* | 7/2013 | Handal | ............. | G06F 17/30017 726/27 |
| 2013/0198861 | A1* | 8/2013 | Kishi | .................... | G06F 21/445 726/28 |
| 2013/0205387 | A1* | 8/2013 | Le | ........................ | G06F 21/316 726/19 |
| 2013/0320212 | A1* | 12/2013 | Valentino | .............. | G01J 1/0488 250/336.1 |
| 2013/0325357 | A1* | 12/2013 | Walerow | ................. | G06F 19/34 702/19 |
| 2014/0047555 | A1 | 2/2014 | Didier | | |
| 2014/0057596 | A1* | 2/2014 | Brill | ...................... | H04L 63/126 455/410 |
| 2014/0067570 | A1* | 3/2014 | Sengupta | ............... | G06Q 30/06 705/21 |
| 2014/0095870 | A1* | 4/2014 | Dewan | .................. | H04L 9/0866 713/167 |
| 2014/0101750 | A1* | 4/2014 | Harrison | ............. | H04L 63/0281 726/12 |
| 2014/0245798 | A1* | 9/2014 | Beckman | ................ | E05B 19/00 70/14 |
| 2014/0263677 | A1* | 9/2014 | Divringi | ........... | G06F 17/30879 235/494 |
| 2014/0307876 | A1* | 10/2014 | Agiomyrgiannakis | | G10L 21/003 381/17 |
| 2014/0310113 | A1* | 10/2014 | Sengupta | ............... | G06Q 20/20 705/17 |
| 2015/0248558 | A1* | 9/2015 | Madou | .................. | G06F 21/577 726/25 |

FOREIGN PATENT DOCUMENTS

| | | |
|---|---|---|
| FR | 2974207 | 10/2012 |
| WO | WO-02/17556 | 2/2002 |
| WO | WO-2006/100655 | 9/2006 |

OTHER PUBLICATIONS

Menezes, A. et al. (1996). Chapter 10: Identification and Entity Authentication, Handbook of Applied Cryptography, CRC Press Series on Discrete Mathematics and its Applications, CRC Press, Boca Raton, FL, pp. 385-424.

Menezes, A. et al. (1996). Chapter 12: Key Establishment Protocols, Handbook of Applied Cryptography, CRC Press Series on Discrete Mathematics and its Applications, CRC Press, Boca Raton, FL, pp. 489-541.

* cited by examiner

STRONG AUTHENTICATION METHOD

CROSS-REFERENCE TO RELATED APPLICATIONS

This application is the U.S. National Stage application of International Application No. PCT/FR2014/000161, filed Jun. 30, 2014, and claims the benefit of French Patent Application No. 1357116, filed Jul. 19, 2013, the disclosures of both of which are incorporated herein by reference in their entirety.

TECHNICAL FIELD

This invention relates to an authentication method and a computer program product implementing this method to secure access to services and the execution of transactions on a data network such as the Internet.

DESCRIPTION OF THE PRIOR ART

With the multiplication of accessible services, especially for the general public, authentication using a password no longer provides an adequate level of protection in areas such as online payments, the performance of remote banking transactions or access to personal and/or confidential information as is the case for medical applications or corporate information systems. Passwords that are too simple, user negligence, their tendency to use similar or the same passwords for many services, as well as the low level of protection of password databases and improved password "cracking" algorithms have resulted in the need to seek more secure alternatives. Many solutions have been proposed thereto.

The solutions consisting in "randomizing" the password or its entry (script, using the password as a mask), or simply securing its transmission (https) are of no help against most vulnerabilities mentioned above. The sending of dynamic passwords by text message or the "call-back" to a prerecorded phone number were seen as a solution, but were proved deficient on a massive scale by malware distributed to phones and "social" attacks on databases containing telephone numbers.

At the other end of the solution spectrum, the "multifactor" authentication based on a hardware device (smart card that protects a key linked to a part of the identity, smart card that contains a biometric fingerprint compared in the card to that of the user) provide greatly increased security, but at significant costs (equipment, distribution and enrollment, card management), complexity or impossibility of implementation on a large scale and/or on heterogeneous user terminals.

To offset these drawbacks which are so many obstacles to a massive dissemination and use, fully multi-factor authentication software solutions have been proposed (mobile apps, authentication clients, digital certificates), however they have a very low security level—and in practice similar to that of a simple password—because of the inability to adequately protect the privacy of the key or the fingerprint stored in a software user environment.

An alternative to the protection of a symmetric or private key through hardware was proposed in FR 2937204 where the symmetric key is a dynamic item of information that is regularly and randomly updated; a "chosen-ciphertext" attack that is possible in a conventional software device is no longer feasible in practice. This method is well suited to the production of "unconnected" tokens, for example an application or a library that generates multi-factor one-time passwords (OTP). The security target of a "connected" token is however more strict because of the possibility, for example, of a malware to execute the authentication mechanism instead of the authorized user, or to copy the token's private key or the user's PIN and send them to a third party.

It would therefore be desirable to have a low-cost, easy-to-use software authentication solution that provides real and effective protection against attacks and vulnerabilities targeting authentication, particularly for a "connected" token. This solution would guarantee the user's identity during access or would secure a transaction against a "Man in the Browser" type of attack, if the attack was implemented on a separate channel from that used to perform the transaction.

DESCRIPTION OF THE INVENTION

To solve one or more of the drawbacks and insufficiencies cited above, a method for authenticating, with an authentication server of a user who has at their disposal a calculator comprising
  a memory area for storing at least one unique identifier specific to the calculator and one first secret key (K0); and
  a processor for calculating at least one non-invertible function (H);
comprises:
  the sending by the calculator of its unique identifier to the authentication server;
  the sending by the authentication server of an item of information (challenge) and an action code to the calculator;
  the sending by the calculator to the authentication server:
    of a first result (R0) of the non-invertible function (H) depending on the item of information (challenge) received from the authentication server, of the first secret key (K0) and of at least one item of data specific to a unique or virtually unique component of the calculator (SN);
    of a second result (RT) of the non-invertible function (H) depending on the result of a Turing test passed by the user, the Turing test being conditional upon the action code; and
    of a third result (R1) of the non-invertible function (H) depending on the item of information (challenge) received from the authentication server, of the first secret key (K0) and of a second secret key (K1);
  the verification by the authentication server of the validity of the unique identifier and of the first, second and third results, and the authentication of the user if all four are valid.

Particular features or embodiments, to be used alone or in combination:
  the second secret key (K1) is a dynamic key that varies each time the authentication method is used, in that, after the user has been authenticated, the authentication server sends a second item of information (delta) to the calculator and the calculator uses the second item of information (delta) to update the second secret key (K1);
  the calculator does not store but calculates on the fly the second secret key (K1);
  when it receives the action code, the calculator presents the user with a password (PIN) input interface, and sends to the authentication server a fourth result (R2) of the non-invertible function (H) depending on the item of information (challenge) received from the authentication server, on the first secret key (K0) and on the password (PIN), the authentication server only authenticating the user after verifying the validity of the fourth result (R2);

the password entry is used as the Turing test;

the first result (R0) is sent before executing the password entry so that, after validating the first result (R0), the authentication server sends to the calculator an item of personal user information that is shown on the password input interface;

after authenticating the user, the authentication server sends to the calculator a third item of information (challenge) and then the calculator generates a fifth result (OTP) of the non-invertible function (H) depending on the third item of information (challenge), on the first or second secret key and on a third secret key specific to the calculator and to a transmitter service of the calculator, and this fifth result is sent to a service server as a one-time password allowing authentication of the user to the service server; and/or as the transmitter service has a public key associated with a private key, the third secret key is stored in the authentication server, protected by the public key of the transmitter service, the associated private key being stored in a non-exportable manner in a cryptographic card.

Thus, without using a specific hardware device, a high level of security is obtained by combining dynamic data with data specific to the calculator's supporting equipment and to the user.

In a second aspect of the invention, a computer program product downloadable from a communications network and/or recorded on a computer readable medium and/or executable by a processor, characterized in that it comprises program code instructions for the implementation of the above authentication method by a computer associated with the user in order to play the role of the calculator.

Particular features or embodiments, to be used alone or in combination:

it is integrated with a web browser in order to function inside thereof; and/or it is downloaded by the web browser when the latter interacts with the authentication server.

BRIEF DESCRIPTION OF FIGURES

The invention will be better understood upon reading the following description, given solely as an example, and with reference to the accompanying figures in which.

EMBODIMENTS

Figure 1:
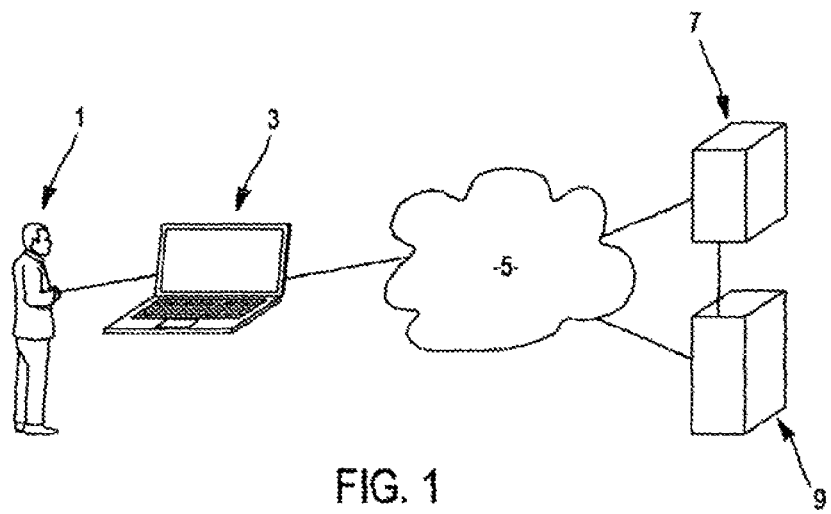
FIG. 1 represents a network system implementing an embodiment of the method of the invention.

In reference to FIG. 1, a user 1 has a computing device 3 connected to a data network 5 such as the Internet. Using this network, the user wants to connect to a service offered by a service server 7. To give access to this service, the service server needs to authenticate the user and uses an authentication server 9.

The computing device 3 may be any device with means for computing, data storage, communication with a data network and interfacing with a user. This can be a mobile phone or personal computer, for example.

The computing device 3 is configured by software to play the role of a token in the authentication method described here. Thus, to facilitate the following description, it will also be called "token" hereinafter.

Figure 2:
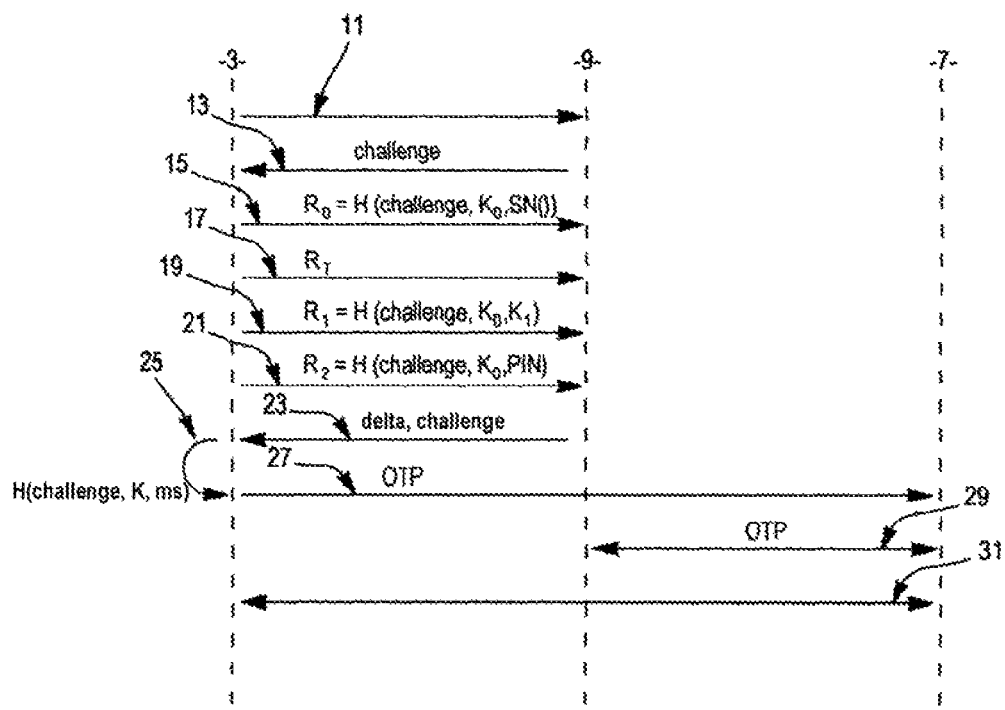
FIG. 2 shows a flowchart of the embodiment implemented by the system in FIG. 1.

In FIG. 2, the steps of the authentication method are shown in three columns, with each column representing a device, in order to show the flows between the various devices.

We first assume that the token 3 implementing the authentication method has a unique ID for the authentication server 9. The method does not imply a particular implementation of the authentication server 9. It may notably be an accessible authentication service, usable online without knowledge of the underlying implementation of this service. This identifier is preferably long enough for the probability of finding a valid identifier to be arbitrarily small.

The token initiates the authentication process by connecting to the authentication server and communicating its identifier, in step 11 in FIG. 2. Preferably, this connection is made through a secure protocol such as https, and the server uses an SSL certificate allowing it to be securely authenticated by its correspondents.

The server responds to this connection, in step 13, by providing a challenge item of information and by combining this information with the identifier provided. It also provides an action code. This response occurs whether the identifier provided corresponds or not to a valid identifier so that an attacker could not infer from the server's response whether the identifier that it uses is valid or not.

We then assume that the token implementing the authentication method has a symmetric key $K_0$. The token connects back to the server and provides, in step 15, an item of information $R_0$ calculated as equal to H(challenge, $K_0$, SN( )), where H is a non-invertible function, for example a hash function, and SN( ) a function returning data that is specific, and therefore unique or virtually unique, to the equipment where the token is instantiated and/or to the token instantiation on this equipment. In the case of an implementation of the invention where the token is a computer library integrated in a "host" application, a portion of SN( ) data may be provided by the host. Furthermore, a person skilled in the art will know how to realize, in a concrete implementation of the invention, the methods for completing the arguments ("padding") and for truncating the result of the non-invertible function as much as required by the implementation choices. The combined use of items of information specific to the equipment—not necessarily always the same from one token to another, or even from one authentication to another—and items of data specific to the token instantiation on the equipment complicate the copying of the token from equipment to another, but is not sufficient to reliably identify the equipment (let alone the user), because any information obtained by the token via software interfaces may be replaced without the knowledge of the token and therefore of the authentication server ("spoofing"). Furthermore, in the case that the token is compromised, which leads to its being revoked, the equipment is only reusable for the authentication process if it is possible to use additional items of information specific to the equipment.

According to the value of the action code received from the server, the token also provides, in step 17, an item of information RT linked to a Turing test passed by the user in an interface presented by the token. The purpose of this test is to ensure that the authentication process was initiated by a user and not by a malware. Many variations are possible for this test, more or less effective in their ability to discriminate or simple from a user's perspective. The invention does not imply anyone in particular. These may include a hardware event difficult to simulate by a malware, identification by the user of a personal item of information among several possible, more or less similar items presented to them, the entry of a "captcha", the response to a logical question asked in natural language, etc.

The token also provides, in step 19, an item of information $R_1$ calculated as if its value was H(challenge, $K_0$, $K_1$), where $K_1$ is a symmetric key specific to the token, and is also a dynamic item of information, i.e., whose value changes at each use of the token through a method which will be described below.

According to the value of the action code received from the server, the token also provides, in step 21, an item of information $R_2$, calculated as if its value was H(challenge, $K_0$, PIN), where PIN is a password entered by the user in an interface displayed by the token. Preferably, when a password has to be entered by the user, the token shows them an item of personal information provided by the server after a successful authentication using the item of information $R_0$.

In a particular implementation of the invention, this item of personal information of the user may be employed for the Turing test mentioned above. In another particular implementation, the PIN entry may itself be used as a Turing test, for example with the help of a virtual keyboard or a virtual keypad whose keys are randomly arranged.

The token handles two types of errors. The first type of error concerns a token that has a valid identifier but has one item of information, $R_0$, $R_T$ or $R_1$, that is incorrect, or has one symmetric key, $K_0$ or $K_1$, that is incorrect, because the token was executed by malware unable to pass the Turing test, or because the equipment where the token is instantiated or the instantiation itself do not match a reference expected by the server (the function SN( ) returning an incorrect value).

The second type of error concerns a token whose items of information $R_0$, $R_T$ (when the server requests it via the action code) and $R_1$ are correct but whose item of information $R_2$ is incorrect, because the PIN entered by the user does not have the correct value.

Many variations are possible as to the precise mode of handling these two types of errors. A decision may be made, for example, to lock a token when one item of information, $R_0$ or $R_1$, is incorrect. The PIN may also be locked if n consecutive values entered by the user are false (the value n=3 is commonly used). The advantage of the method is that an attacker who does not have the user's token (correct $R_0$, $R_T$ and $R_1$) cannot lock the PIN or the user's access. The error handling procedure may distinguish a locked token (allowing the legitimate user to use another token they might have) from a locked PIN (that may or may not be common to several tokens of a same user, as is the case when implementing a "PIN chaining").

The features enabling the release (of the token, PIN, or another token), the synchronization, but also the initial activation of a token for a service, and the addition of an additional service may rely directly on the authentication method that is the object of the invention. In this case, the token specifies in its initial request the desired action, and the action code provided by the server is extended beyond the actions related to the generation of an OTP to cover other features of the token. In particular, the token may display or send a code or a link to the user to enable them to perform an operation on another token or another user profile; the token may also require the provision of an activation (or release, or service-adding, or password reset) code, this code having, for example, been sent to the user by the transmitter of the token (for example, the service implementing the user authentication method), or having been obtained by the user through another token, or having been obtained from the present token. The codes or links obtained from the tokens may be displayed or sent through a communications service (IM, email, text message, etc.) whose address had been previously defined and validated by the server.

Furthermore, many variations are possible as to the provision of an error code by the server at each step. It is desirable to minimize the "attack surface", i.e., the items of information provided to an attacker that enable the efficiency of the attack. Preferably, an unknown or invalid identifier will not be reported in response to the initial request and the type of error (invalid identifier, incorrect $R_0$, $R_T$ or $R_1$) will not be specified so that the attacker would have no means for improvement.

The action code may help, as we have seen above, in the implementation of a Turing test or in the user's entering their PIN. The action code is defined, first, by the policy of the service that transmitted the token. This policy may combine fixed and contextual rules linked, for example, to the time elapsed since the last authentication, the location of the user, the time, etc. The action code is also defined by the error handling procedure. For example, the action code may force the user to enter a PIN if any of the error counters associated with the token or the PIN is not zero, even when the policy of the service that transmitted the token would not ask for that.

Depending on the implementation, other items of information may be provided by the server in any one of the steps, such as the URL of the service transmitting the token, items of information allowing the user to identify this service (name, logo, etc.), items of information about the authentication page form of that service so that the OTP generated by the token is not provided to a third party in the case of an html injection into the page, the user identifier for this service to avoid its re-entry, items of information contained in the user's profile on the server which may be inserted into additional fields of the authentication page specifying, for example, specific user rights.

The server responds, in step 23, to the sending of the items of information $R_0$, $R_T$, $R_1$, $R_2$ by providing a delta item of information that it combines with the identifier of the token, as well as a challenge item of information if the initial request sent by the token concerns the generation of an OTP.

The challenge item of information is used by the token to calculate, in step 25, the OTP locally as equal to H(challenge, K, $m_s$), where K is a key specific to the token (possibly $K_0$ or $K_1$) and $m_s$ is a key specific to the token and to the service that transmitted the token. It is thus possible, according to one implementation of the invention, to employ the same token for multiple services using distinct $m_s$ keys. In one implementation version of this invention, ms is initialized by the token upon activation of a service and protected during transmission to the authentication server by the public portion of a key of the token transmitter (the service) provided on the fly by the authentication server during activation, itself fully protected by a "factory key" whose public portion is embedded in the token's code. This type of protection is useful for the initial transmission of the $m_s$ key, but also for the protection of this key when it is stored by the authentication server, particularly if the service is provided online. In another implementation version of this invention, the OTP validation algorithm is executed on the server in a cryptographic card and the private portion of the transmitter's key is stored only in the cryptographic card and cannot be exported.

Depending on the implementation, in step 27 the calculated OTP is displayed to the user or inserted directly into the form on the service's authentication page. In step 27, the service uses the authentication server 9 to check the validity of the OTP (validity of the keys and context compliance, such as time, identical IP addresses viewed from the service and the server, user location, time slot, etc.) and, if necessary, in step 31 to grant access to the user or to authorize a transaction.

The delta item of information is used by the token to update the $K_1$ key, for example by calculating $K_{1,\,new}$=H (delta, $K_{1,\,old}$). If the items of information received by the server, $R_0$, $R_T$ and $R_1$ are correct, the server performs the same update operation. Depending on how the errors of the first type are handled in the implementation, it is also possible to diverge the local version of the token and that of the server of $K_1$ by updating the server version only when certain items of information received by the server among $R_0$, $R_T$ and $R_1$ are correct, which results in locking the token of an attacker. Conversely, to prevent potential loss of connection problems during the authentication, it is possible to keep a history of one or more values of $K_1$ on the server and to check $R_1$ against the possible values. To not lower the security level of the device linked to a dynamic key, it is preferable to limit this history to a single value. If the correct verification of $R_1$ is performed against a value of $K_1$ from the history, the more recent values are deleted.

In another implementation version of this invention, $K_1$ is not a stored item of information but an item of information $RTK_1$, calculated on the fly using an item of information that is stored or resides in an RTS location also calculated on the fly, according to the method described in FR 2974207. This prevents the copying of $K_1$ by a malware, outside execution since RTS is not available and the token may not store any information in the file system, but also during the execution which can not be carried out by a malware except for the Turing test when implemented.

In another implementation version, the token is an application that resides on a user device. It provides user input and display interfaces, notably a list of services to which it may authenticate, the PIN entry and the display of the calculated OTP.

In another implementation version, the token is software installed in a web browser ("extension"), which may thus interact directly with the service's authentication page and automate the connection and the identification to the service. In this implementation, if the user identifier ("login") for the service is not provided by the server, the user may enter it themselves in the token's interface, and the token may memorize the identifier to avoid re-entering it for subsequent use.

In another implementation version, the token consists of both an extension of a browser allowing it to interact with the service's authentication page and a resident application on the machine acting as the local server that manages a dialogue with this page through the extension. In this variant, it is possible to provide the token with the capabilities to communicate with the web pages of the services, so that said web pages can tailor the displayed content to users depending on, for example, whether a token is present or not, activated or not, locked or not.

In another implementation version, the token is not installed on the user's equipment, only the token-specific items of information (identifier, $K_0$, $K_1$, $m_s$) are installed, in the context of the web browser. The authentication method is implemented in a script provided online from a certificate-protected domain where the server is also located, and from where exchanges with the token take place. This implementation allows to prevent any access by a server or a third-party to items of information specific to the token. This script is called by the service's authentication page. Lastly, the script is provided to the user only if the service that calls for it is authorized to use the authentication server. In this implementation, it is possible to create an SSO (single sign-on) web page provided by the certificate-protected domain in order to show the user all of its services, to which the user may connect and authenticate using the token.

In another implementation version, the token is implemented in a script provided online and a browser extension enables the interaction with the authentication page. This implementation allows the SN( ) function to return items of information that are not stored in the context of the browser, allows the RTS location to refer to items of information that do not live in the context of the browser, and lastly allows the interaction with service authentication pages without the need for these to call the script, which may then be directly called by the extension.

In another implementation version of the invention, the token manages multiple users' profiles. This management procedure is first manual (the user selects their corresponding user profile). This management procedure may be made smart, i.e., directly show the user the user profile(s) activated for this service.

The invention has been illustrated and described in detail in the drawings and the above description. The latter should be regarded as illustrative and offered as a non-limited example, and also as not limiting the invention to this single description. Many embodiments are possible.

In the claims, the word "comprising" does not exclude other items and the indefinite article "a/an" does not exclude a plurality of items.

The invention claimed is:

1. A method for authenticating, with an authentication server, a user having at their disposal a calculator comprising
   a memory area for storing at least one unique identifier specific to the calculator and one first secret key (K0); and
   a processor for calculating at least one non-invertible function (H);
the method comprising:
   sending by the calculator the unique identifier to the authentication server;
   sending by the authentication server of an item of information (challenge) and an action code to the calculator;
   sending by the calculator to the authentication server:
      a first result (R0) of the non-invertible function (H) depending on the item of information (challenge) received from the authentication server, the first secret key (K0) and at least one item of data specific to a unique or virtually unique component of the calculator (SN);
      a second result (RT) of the non-invertible function (H) depending on the result of a Turing test passed by the user, the Turing test being conditional upon the action code; and
      a third result (R1) of the non-invertible function (H) depending on the item of information (challenge) received from the authentication server, the first secret key (K0) and a second secret key (K1);

verifying by the authentication server the validity of the unique identifier and the first, second and third results, and the authentication of the user when all four are valid.

2. The method according to claim 1, characterized in that the second secret key (K1) is a dynamic key that varies each time the authentication method is used, in that, after the user has been authenticated, the authentication server sends a second item of information (delta) to the calculator and the calculator uses the second item of information (delta) to update the second secret key (K1).

3. The method according to claim 2, characterized in that the calculator does not store but calculates on the fly the second secret key (K1).

4. The method according to claim 1, wherein when the calculator receives the action code, the calculator presents the user with a password (PIN) input interface, and sends to the authentication server a fourth result (R2) of the non-invertible function (H) depending on the item of information (challenge) received from the authentication server, on the first secret key (K0) and on the password (PIN), the authentication server only authenticating the user after verifying the validity of the fourth result (R2).

5. The method according to claim 4, characterized in that the password entry is used as the Turing test.

6. The method according to claim 4, characterized in that the first result (R0) is sent before executing the password entry so that, after validating the first result (R0), the authentication server sends to the calculator an item of personal user information that is shown on the password input interface.

7. The method according to claim 1, wherein, after authenticating the user, the authentication server sends to the calculator a third item of information (challenge) and then the calculator generates a fifth result (OTP) of the non-invertible function (H) depending on the third item of information (challenge), on the first or second secret key and on a third secret key specific to the calculator and to a transmitter service of the calculator, and this fifth result is sent to a service server as a one-time password to authenticate the user to the service server.

8. The method according to claim 7 characterized in that, as the transmitter service has a public key associated with a private key, the third secret key is stored in the authentication server, protected by the public key of the transmitter service, the associated private key being stored in a non-exportable manner in a cryptographic card.

9. A computer program product downloadable from a communications network or recorded on a computer readable medium or executable by a processor, characterized in that the computer program product comprises program code instructions stored on a non-transitory medium for the implementation of the authentication method by a computer associated with the user in order to play the role of the calculator according to claim 1.

10. The computer program product according to claim 9, characterized in that it is integrated with a web browser in order to function inside thereof.

11. The computer program product according to claim 10, characterized in that it is downloaded by the web browser when the latter interacts with the authentication server.

* * * * *